United States Patent
Kuo

(10) Patent No.: US 11,659,239 B2
(45) Date of Patent: May 23, 2023

(54) MANAGING USER PROFILES ON ELECTRONIC DEVICES

(71) Applicant: Sony Corporation, Tokyo (JP)

(72) Inventor: Jenke Wu Kuo, San Diego, CA (US)

(73) Assignee: SONY GROUP CORPORATION, Tokyo (JP)

(\*) Notice: Subject to any disclaimer, the term of this patent is extended or adjusted under 35 U.S.C. 154(b) by 21 days.

(21) Appl. No.: 17/011,940

(22) Filed: Sep. 3, 2020

(65) Prior Publication Data

US 2022/0070528 A1 Mar. 3, 2022

(51) Int. Cl.
*H04N 21/4415* (2011.01)
*H04N 21/45* (2011.01)
*G06F 3/16* (2006.01)
*G10L 15/08* (2006.01)
*G10L 25/54* (2013.01)
*G10L 17/00* (2013.01)

(52) U.S. Cl.
CPC ......... *H04N 21/4415* (2013.01); *G06F 3/167* (2013.01); *G10L 15/08* (2013.01); *G10L 17/00* (2013.01); *G10L 25/54* (2013.01); *H04N 21/4532* (2013.01)

(58) Field of Classification Search
CPC ........... H04N 21/4415; H04N 21/4535; H04N 21/25891; H04N 21/4532; G06F 3/167; G10L 15/08; G10L 17/00; G10L 25/54

USPC .......................................................... 725/37
See application file for complete search history.

(56) References Cited

U.S. PATENT DOCUMENTS

| | | | |
|---|---|---|---|
| 7,185,355 B1 * | 2/2007 | Ellis | H04N 5/44543 725/46 |
| 9,674,563 B2 * | 6/2017 | Wheatley | H04N 21/44218 |
| 10,037,938 B2 * | 7/2018 | Kim | H01L 21/561 |
| 10,171,586 B2 | 1/2019 | Shaashua et al. | |
| 10,440,499 B2 * | 10/2019 | Farrell | H04W 4/08 |
| 2017/0055126 A1 | 2/2017 | O'Keeffe | |
| 2018/0348718 A1 | 12/2018 | Richardson et al. | |
| 2019/0295125 A1 | 9/2019 | Marino et al. | |
| 2020/0194004 A1 * | 6/2020 | Bates | G10L 15/22 |

\* cited by examiner

*Primary Examiner* — Nnenna N Ekpo
(74) *Attorney, Agent, or Firm* — Trellis IP Law Group, PC

(57) ABSTRACT

Embodiments generally relate to managing user profiles on electronic devices. In some embodiments, a method includes detecting a voice of a first user. The method further includes identifying the first user from among a plurality of users based on the voice. The method further includes accessing a first user profile based on the identifying of the first user, where the first user profile is associated with the first user. The method further includes configuring a client device based on the first user profile. The method further includes presenting at least one media content item on the client device based on the configuring of the client device.

17 Claims, 4 Drawing Sheets ated with the first user; configuring a client device based on the first user profile; and presenting at least one media content item on the client device based on the configuring of the client device.

MANAGING USER PROFILES ON ELECTRONIC DEVICES

BACKGROUND

Conventional consumer electronic media devices such as televisions, smart phones, etc. need to be set up manually. For example, a user typically accesses a menu on a device, navigates the menu and submenus to find particular settings, and then adjusts settings as desired. Example settings may include audio settings, video settings, etc. Navigating menus and adjusting settings can be tedious, time consuming, and/or confusing.

SUMMARY

Embodiments generally relate to managing user profiles on electronic devices. In some embodiments, a system includes one or more processors, and includes logic encoded in one or more non-transitory computer-readable storage media for execution by the one or more processors. When executed, the logic is operable to cause the one or more processors to perform operations including: detecting a voice of a first user; identifying the first user from among a plurality of users based on the voice; accessing a first user profile based on the identifying of the first user, where the first user profile is associated with the first user; configuring a client device based on the first user profile; and presenting at least one media content item on the client device based on the configuring of the client device.

With further regard to the system, in some embodiments, the client device is a consumer electronic device. In some embodiments, the client device is a television. In some embodiments, the client device is a smart phone. In some embodiments, the logic when executed is further operable to cause the one or more processors to perform operations including: receiving a first command from the first user, where the command is in a form of the voice; and presenting the at least one media content item on the client device based on the configuring of the client device and based on the first command. In some embodiments, the logic when executed is further operable to cause the one or more processors to perform operations including: determining that the client device is configured based on a second user profile; and switching configuration of the client device such that the client device is configured to the first user profile. In some embodiments, the logic when executed is further operable to cause the one or more processors to perform operations including: computing a profile priority of a plurality of user profiles, where the plurality of user profiles includes the first user profile and a second user profile; and configuring the client device based on the first user profile, where one or more settings of the second user profile override one or more respective settings of the first user profile.

In some embodiments, a non-transitory computer-readable storage medium with program instructions thereon is provided. When executed by one or more processors, the instructions are operable to cause the one or more processors to perform operations including: detecting a voice from a first user; identifying the first user from among a plurality of users based on the voice; accessing a first user profile based on the identifying of the first user, where the first user profile is associated with the first user; configuring a client device based on the first user profile; and presenting at least one media content item on the client device based on the configuring of the client device.

With further regard to the computer-readable storage medium, in some embodiments, the client device is a consumer electronic device. In some embodiments, the client device is a television. In some embodiments, the client device is a smart phone. In some embodiments, the logic when executed is further operable to cause the one or more processors to perform operations including: receiving a first command from the first user, where the command is in a form of the voice; and presenting the at least one media content item on the client device based on the configuring of the client device and based on the first command. In some embodiments, the logic when executed is further operable to cause the one or more processors to perform operations including: determining that the client device is configured based on a second user profile; and switching configuration of the client device such that the client device is configured to the first user profile. In some embodiments, the logic when executed is further operable to cause the one or more processors to perform operations including: computing a profile priority of a plurality of user profiles, where the plurality of user profiles includes the first user profile and a second user profile; and configuring the client device based on the first user profile, where one or more settings of the second user profile override one or more respective settings of the first user profile.

In some embodiments, a method includes detecting a voice from a first user; identifying the first user from among a plurality of users based on the voice; accessing a first user profile based on the identifying of the first user, where the first user profile is associated with the first user; configuring a client device based on the first user profile; and presenting at least one media content item on the client device based on the configuring of the client device.

With further regard to the method, in some embodiments, the client device is a consumer electronic device. In some embodiments, the client device is a television. In some embodiments, the client device is a smart phone. In some embodiments, the method further includes: receiving a first command from the first user, where the command is in a form of the voice; and presenting the at least one media content item on the client device based on the configuring of the client device and based on the first command. In some embodiments, the method further includes: determining that the client device is configured based on a second user profile; and switching configuration of the client device such that the client device is configured to the first user profile.

A further understanding of the nature and the advantages of particular embodiments disclosed herein may be realized by reference of the remaining portions of the specification and the attached drawings.

DETAILED DESCRIPTION

Embodiments described herein enable, facilitate, and manage the user profiles on electronic devices. As described in more detail herein, in various embodiments, a system detects a voice of a first user. The system then identifies the first user from among a plurality of users based on the voice. The system then accesses a first user profile based on the identifying of the first user, where the first user profile is associated with the first user. The system then configures a client device based on the first user profile. The system then presents at least one media content item on the client device based on the configuring of the client device.

Figure 1:
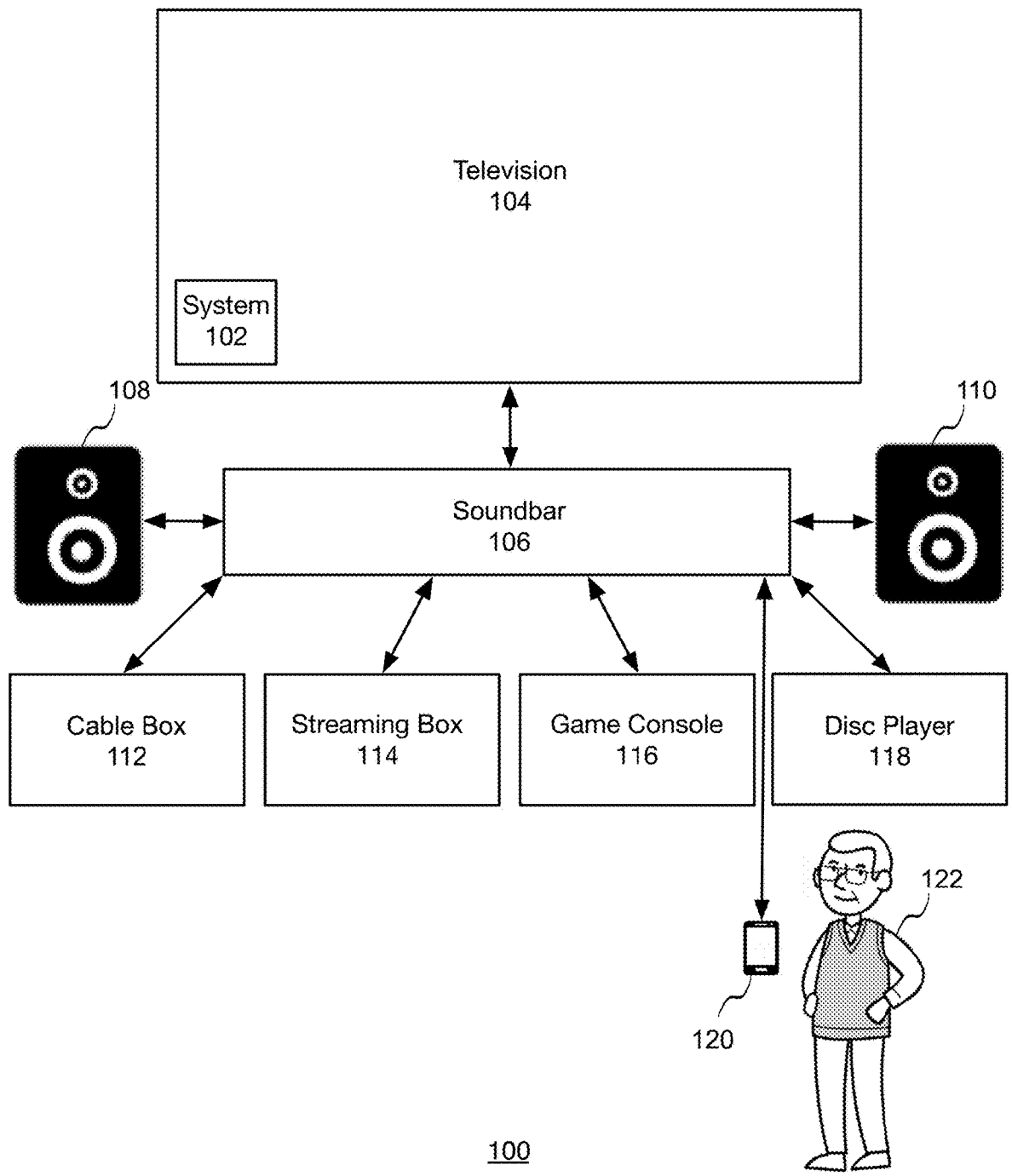
FIG. 1 is a block diagram of an example media environment for managing user profiles on an electronic device, which may be used for embodiments described herein.

FIG. 1 is a block diagram of an example media environment 100 for managing user profiles on an electronic device, which may be used for embodiments described herein. In some embodiments, media environment 100 includes a system 102 and various client devices. In various embodiments, the client devices are consumer electronic devices. As shown, in various embodiments, the client devices may include a television 104, a soundbar 106, speakers 108 and 110, a cable box 112, a streaming box 114, a game console 116, a disc player 118, and a remote control device 120. Disc player 118 may be a compact disc (CD) player, digital video disc (DVD) player, etc. These client devices may also be referred to as client devices 104-118 or consumer electronic devices 102-118. These client devices may include other home theater components.

The components or elements shown are example elements and may vary, depending on the particular embodiment. In other embodiments, media environment 100 may not have all of the components shown and/or may have other components including other types of components instead of, or in addition to, those shown herein. In the various embodiments described herein, a processor of system 102 may cause the components described herein to cause information such as settings, commands, messages, user preferences, etc. to be displayed in a user interface on one or more display screens.

In various embodiments, system 102 may be integrated into television 104, and system 102 may facilitate the user in configuring the settings of television 104. While some embodiments are described herein in the context of system 102 residing in television 104 these embodiments also apply to the system residing in other consumer electronic media devices (e.g., smart phone, tablet, smart watch, soundbar, cable box, streaming box game console, disc player, etc.). In various embodiments, system 102 may be located remotely in other locations such as in the cloud.

In various embodiments, system 102 may communicate with user 122 by voice. In some embodiments, system 102 may also communicate with user 122 via a remote control device such as remote control device 120. In various embodiments, remote control device 120 may be substituted with a smart phone or other smart device. In this particular example, remote control device 120 is a smart phone. In various embodiments, remote control device 120 may be any remote control device such as one provided by the manufacture of television 104.

While system 102 performs embodiments described herein, in other embodiments, any suitable component or combination of components associated with system 102 or any suitable processor or processors associated with system 102 may facilitate performing the embodiments described herein.

Figure 2:
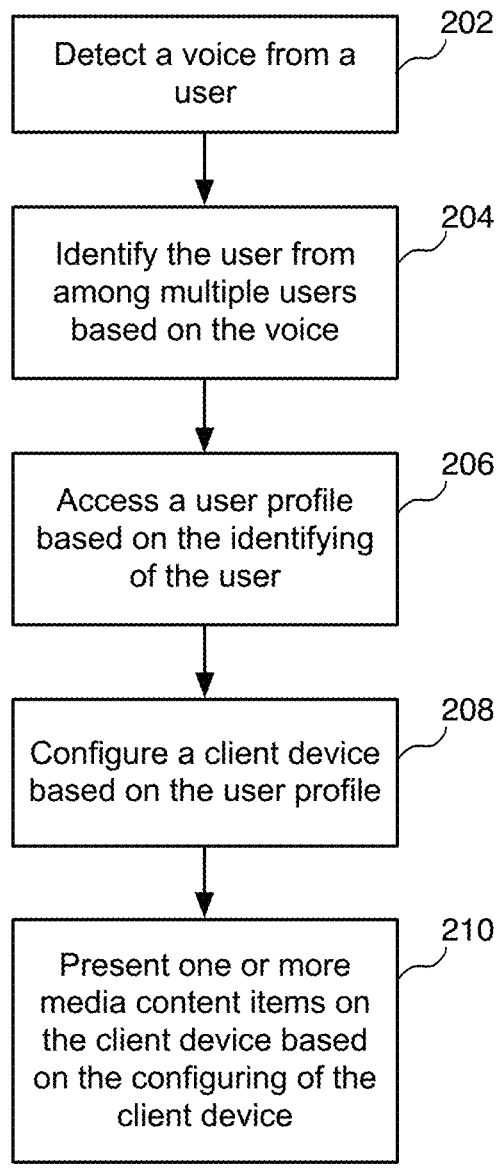
FIG. 2 illustrates an example flow diagram for managing user profiles on an electronic device, according to some embodiments.

FIG. 2 is an example flow diagram for managing user profiles on an electronic device, according to some embodiments. Referring to both FIGS. 1 and 2, a method is initiated at block 202, where a system such as system 102 detects a voice of a user. In various embodiments, system 102 may detect the user's voice via a microphone integrated with or controlled by any of client devices 104-118, for example.

At block 204, system 102 identifies the user from among multiple users based on the voice. For example, the user may be any member of a household of users. In various embodiments, system 102 may store one or more user profiles associated with respective users. Each user profile may be associated with voice information such as one or more records of a voice, characteristics of a voice, etc. In various embodiments, system 102 may apply one or more voice recognition techniques to match the detected voice to the voice associated the particular user.

At block 206, system 102 accesses a user profile based on the identifying of the user, where the user profile is associated with the user. For example, once system 102 identifies the voice of the user, system 102 accesses the user profile locally stored at system 102 or remotely stored elsewhere such as in the cloud.

In some embodiments, the system may export or transfer the user profile to other client devices. For example, the system may have a user profile that is associated with the smart phone of the given user. The system may enable the user to indicate to the system to transfer the user profile to a second client device such as a tablet. In various embodiments, the system may associate multiple user profiles from multiple different users with the same client device. For example, if a client device that is a television may be associated with the user profile of an entire household.

At block 208, system 102 configures a client device based on the user profile. As indicated above, in various embodiments, the client device is a consumer electronic device. For example, in various embodiments, the client device may be a television. The client device may be any consumer electronic device, depending on the particular implementation. For example, in some embodiments, the client device may be a smart phone.

At block 210, system 102 presents at least one media content item on the client device based on the configuring of the client device. For example, in various embodiments, the system receives a command from the user, where the command is in a form of the voice. The command may be, for example, a command to play a Movie A. The system then accesses the media content item (e.g., Movie A). The system then presents the media content item on the client device based on the configuring of the client device and based on the command. For example, the system may configure the client device with settings according to the user profile. The system may then present or display the media content item (e.g., Movie A) on the client device.

In an example scenario, the system may detect and determine that the client device is configured based on a second user profile. If the system hears the voice of the first user, the system accesses the user profile of the first user, or first user profile. The system then switches configuration of the client device from the second user profile such that the client device is subsequently configured to the first user profile.

In various embodiments, the system may utilize artificial intelligent (AI) and machine learning in order to manage the user profiles as well as to carry out the embodiments described herein. For example, the system may perform any one or more steps described in connection with FIG. 2 using AI and machine learning.

In various embodiments, system 102 computes a profile priority for a set of multiple user profiles. For example, in various embodiments, the user profiles may include a first user profile and a second user profile. The first user profile may be for a child. The second user profile may be for a parent. In various embodiments, if the priority for the child is higher than the priority for the parent, the system configures the client device based on the higher-priority user profile (e.g., user profile of the child). In various embodiments, one or more settings of the user profile for the child override one or more respective settings of the user profile of the parent. For example, if the user profile of the child restricts rated R movies and if the user profile of the child ranks higher than the user profile of the parent, the system will cause the client device to restrict rated R movies per the user profile of the child.

In various embodiments, the system may automatically without user intervention switch the configuration settings of a given device to the appropriate user profile upon hearing the voice of the user. As a result, embodiments enable end users to enjoy their devices configured to their preferred settings. Embodiments eliminate and/or minimize the need for users to navigate device menus.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

The following are additional embodiments that system 102 may apply in combination with other embodiments described herein. For example, in various embodiments, the system may update user profiles based on personal use patterns. For example, the system may automatically without user intervention detect when a given user manually configures his or her client device. The system may then automatically update the user profile. In some embodiments, the system may update the user profile after a predetermined number of times that the user updates a particular setting to the same value. For example, if the user manually sets the brightness to a particular level at least twice, or thrice, etc., the system may update the user profile such that the brightness is at the particular level by default. The particular setting associated with a particular use pattern may vary, depending on the particular embodiments. For example, the setting may include audio settings (e.g., volume settings, equalizer settings, stereo settings, etc.), visual settings (e.g., brightness, contrast, etc.), content categories (e.g., genre categories, etc.), parental control settings, etc.

In various embodiments, the system may switch and/or adjust user profile settings based on the location of a given client device. For example, the system may detect that a given device located at home, work, etc. The system may associate the given location with a particular user profile (e.g., User A—Home, User A—Work, User B—Home, User B—Work, etc.). For example, a given User A may have particular preferences for use at home and particular preferences for use at work. Accordingly, the system may automatically switch to the appropriate user profile based on the user or voice of the user and the location.

In various embodiments, the system may switch and/or adjust user profile settings based on the day or time of day. For example, the system may detect the day is Monday and the time is 7:00 p.m. The system may associate the day and/or time with particular user profile settings. For example, a given User A may have particular preferences for use on a weekday in the evening. Accordingly, the system may automatically switch to the appropriate user profile based on the day or time of day.

In various embodiments, the system may apply privacy and security settings based on the user profile. For example, if the system switches the user profile to a different user (e.g., from User A to User B, etc.), the system may automatically apply the privacy and security settings for the different user (e.g., User B).

In various embodiments, the system may protect a given client device in order to prevent device from being stolen. In some embodiments, the system may update the user profile to lock the client device if the client device is moved to an unauthorized location. For example, the system may enable the user to select locations for using a given client device (e.g., at home, at work, etc.). If the system detects that the client device is moved a location other than at these location, the system may lock the client device. In various embodiments, the system enables the user to set which locations are authorize and/or unauthorized.

Embodiments described herein provide various benefits. For example, embodiments described herein minimize or eliminate the need for a user to manually set up a consumer electronic media device. Embodiments described herein also automatically adjust settings (e.g., audio settings, video settings, parental control settings, etc.), thereby enhancing user experience. Embodiments described herein also automatically switch the configuration of a given consumer electronic media device to the appropriate settings based on hearing the voice of the user.

Figure 3:
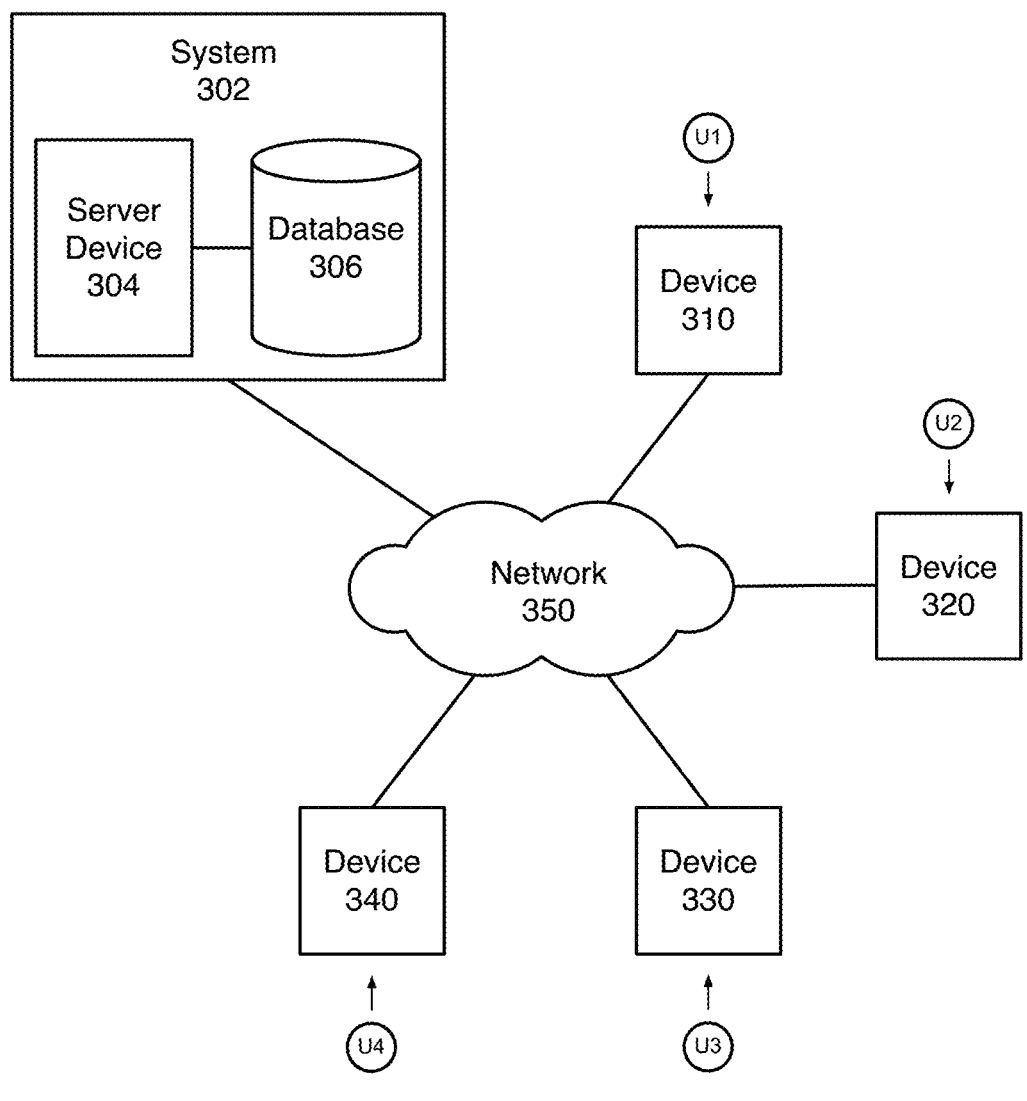
FIG. 3 is a block diagram of an example network environment, which may be used for some embodiments described herein.

FIG. 3 is a block diagram of an example network environment 300, which may be used for some embodiments described herein. In some embodiments, network environment 300 includes a system 302, which includes a server device 304 and a database 306. For example, system 302 may be used to implement system 102 of FIG. 1, as well as to perform embodiments described herein. Network environment 300 also includes client devices 310, 320, 330, and 340, which may communicate with system 302 and/or may communicate with each other directly or via system 302. Network environment 300 also includes a network 350 through which system 302 and client devices 310, 320, 330, and 340 communicate. Network 350 may be any suitable communication network such as a Wi-Fi network, Bluetooth network, the Internet, etc.

For ease of illustration, FIG. 3 shows one block for each of system 302, server device 304, and database 306, and shows four blocks for client devices 310, 320, 330, and 340. Blocks 302, 304, and 306 may represent multiple systems, server devices, and databases. Also, there may be any number of client devices. In other embodiments, environment 300 may not have all of the components shown and/or may have other elements including other types of elements instead of, or in addition to, those shown herein.

While server device 304 of system 302 performs embodiments described herein, in other embodiments, any suitable component or combination of components associated with system 302 or any suitable processor or processors associated with system 302 may facilitate performing the embodiments described herein.

In the various embodiments described herein, a processor of system 302 and/or a processor of any client device 310, 320, 330, and 340 cause the elements described herein (e.g., information, etc.) to be displayed in a user interface on one or more display screens.

Figure 4:
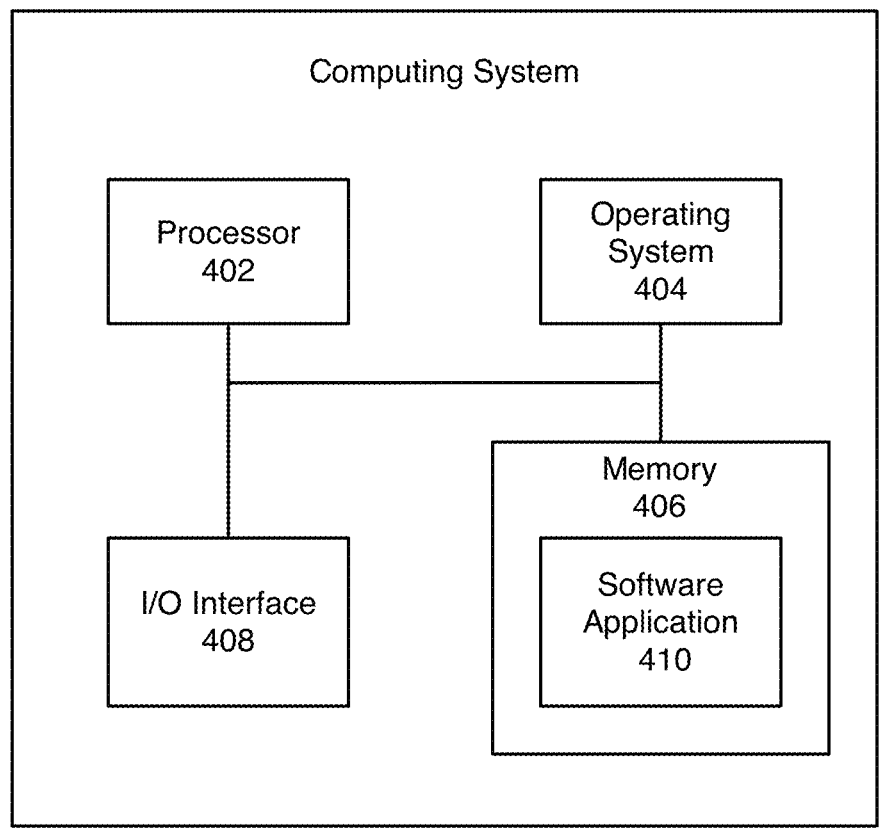
FIG. 4 is a block diagram of an example computer system, which may be used for some embodiments described herein.

FIG. 4 is a block diagram of an example computer system 400, which may be used for some embodiments described herein. For example, computer system 400 may be used to implement server device 304 of FIG. 3 and/or system 102 of FIG. 1, as well as to perform embodiments described herein. In some embodiments, computer system 400 may include a processor 402, an operating system 404, a memory 406, and an input/output (I/O) interface 408. In various embodiments, processor 402 may be used to implement various functions and features described herein, as well as to perform the method embodiments described herein. While processor 402 is described as performing embodiments described herein, any suitable component or combination of components of computer system 400 or any suitable processor or processors associated with computer system 400 or any suitable system may perform the steps described. Embodiments described herein may be carried out on a user device, on a server, or a combination of both.

Computer system 400 also includes a software application 410, which may be stored on memory 406 or on any other suitable storage location or computer-readable medium. Software application 410 provides instructions that enable processor 402 to perform the embodiments described herein and other functions. Software application may also include an engine such as a network engine for performing various functions associated with one or more networks and network communications. The components of computer system 400 may be implemented by one or more processors or any combination of hardware devices, as well as any combination of hardware, software, firmware, etc.

For ease of illustration, FIG. 4 shows one block for each of processor 402, operating system 404, memory 406, I/O interface 408, and software application 410. These blocks 402, 404, 406, 408, and 410 may represent multiple processors, operating systems, memories, I/O interfaces, and software applications. In various embodiments, computer system 400 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and embodiments.

In various embodiments, software is encoded in one or more non-transitory computer-readable media for execution by one or more processors. The software when executed by one or more processors is operable to perform the embodiments described herein and other functions.

Any suitable programming language can be used to implement the routines of particular embodiments including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the embodiments described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and logic encoded in one or more non-transitory computer-readable storage media for execution by the one or more processors and when executed operable to cause the one or more processors to perform operations comprising:

detecting a voice of a first user;

identifying the first user from among a plurality of users based on the voice;

accessing a first user profile based on the identifying of the first user, wherein the first user profile is associated with the first user;

configuring a client device based on the first user profile of the first user;

presenting at least one media content item on the client device based on the configuring of the client device;

computing a plurality of profile priorities of a plurality of user profiles, wherein the plurality of user profiles comprises the first user profile of the first user and a second user profile of the first user, and wherein the second user profile has a higher profile priority than a profile priority of a first user priority;

accessing the second user profile based on the second user profile having the higher profile priority than the profile priority of the first user priority; and configuring the client device based on the second user profile, wherein one or more settings of the second user profile override one or more respective settings of the first user profile, wherein the client device switches from the first user profile of the first user to the second user profile of the first user based on one or more of a day and a time of day, and wherein the client device switches from the first user profile to the second user profile based on a location of the client device.

2. The system of claim 1, updating one or more of the first user profile and the second user profile based on personal use patterns.

3. The system of claim 1, wherein the client device is a smart phone.

4. The system of claim 1, wherein the logic when executed is further operable to cause the one or more processors to perform operations comprising:

receiving a first command from the first user, wherein the first command is in a form of the voice; and presenting the at least one media content item on the client device based on the configuring of the client device and based on the first command.

5. The system of claim 1, wherein the logic when executed is further operable to cause the one or more processors to perform operations comprising:

determining that the client device is configured based on a second user profile; and switching configuration of the client device such that the client device is configured to the first user profile.

6. A non-transitory computer-readable storage medium with program instructions stored thereon, the program instructions when executed by one or more processors are operable to cause the one or more processors to perform operations comprising:

detecting a voice of a first user;

identifying the first user from among a plurality of users based on the voice;

accessing a first user profile based on the identifying of the first user, wherein the first user profile is associated with the first user;

configuring a client device based on the first user profile of the first user;

presenting at least one media content item on the client device based on the configuring of the client device;

computing a plurality of profile priorities of a plurality of user profiles, wherein the plurality of user profiles comprises the first user profile of the first user and a second user profile of the first user, and wherein the second user profile has a higher profile priority than a profile priority of a first user priority;

accessing the second user profile based on the second user profile having the higher profile priority than the profile priority of the first user priority; and configuring the client device based on the second user profile, wherein one or more settings of the second user profile override one or more respective settings of the first user profile, wherein the client device switches from the first user profile of the first user to the second user profile of the first user based on one or more of a day and a time of day, and wherein the client device switches from the first user profile to the second user profile based on a location of the client device.

7. The computer-readable storage medium of claim 6, wherein the client device is a consumer electronic device.

8. The computer-readable storage medium of claim 6, wherein the client device is a television.

9. The computer-readable storage medium of claim 6, wherein the client device is a smart phone.

10. The computer-readable storage medium of claim 6, wherein the instructions when executed are further operable to cause the one or more processors to perform operations comprising:

receiving a first command from the first user, wherein the first command is in a form of the voice; and presenting the at least one media content item on the client device based on the configuring of the client device and based on the first command.

11. The computer-readable storage medium of claim 6, wherein the instructions when executed are further operable to cause the one or more processors to perform operations comprising:

determining that the client device is configured based on a second user profile; and switching configuration of the client device such that the client device is configured to the first user profile.

12. A computer-implemented method comprising:

detecting a voice of a first user;

identifying the first user from among a plurality of users based on the voice;

accessing a first user profile based on the identifying of the first user, wherein the first user profile is associated with the first user;

configuring a client device based on the first user profile of the first user;

presenting at least one media content item on the client device based on the configuring of the client device;

computing a plurality of profile priorities of a plurality of user profiles, wherein the plurality of user profiles comprises the first user profile of the first user and a second user profile of the first user, and wherein the second user profile has a higher profile priority than a profile priority of a first user priority;

accessing the second user profile based on the second user profile having the higher profile priority than the profile priority of the first user priority; and configuring the client device based on the second user profile, wherein one or more settings of the second user profile override one or more respective settings of the first user profile, wherein the client device switches from the first user profile of the first user to the second user profile of the first user based on one or more of a day and a time of day, and wherein the client device switches from the first user profile to the second user profile based on a location of the client device.

13. The method of claim 12, wherein the client device is a consumer electronic device.

14. The method of claim 12, wherein the client device is a television.

15. The method of claim 12, wherein the client device is a smart phone.

16. The method of claim 12, further comprising:
receiving a first command from the first user, wherein the first command is in a form of the voice; and
presenting the at least one media content item on the client device based on the configuring of the client device and based on the first command.

17. The method of claim 12, further comprising:
determining that the client device is configured based on a second user profile; and
switching configuration of the client device such that the client device is configured to the first user profile.

* * * * *